United States Patent
Gyl et al.

(10) Patent No.: US 8,352,701 B2
(45) Date of Patent: Jan. 8, 2013

(54) METHOD FOR UTILIZING A MEMORY INTERFACE TO CONTROL PARTITIONING OF A MEMORY MODULE

(75) Inventors: Yevgen Gyl, Tampere (FI); Jussi Hakkinen, Tampere (FI); Kimmo Mylly, Ylöjärvi (FI)

(73) Assignee: Nokia Corporation, Espoo (FI)

(*) Notice: Subject to any disclaimer, the term of this patent is extended or adjusted under 35 U.S.C. 154(b) by 467 days.

(21) Appl. No.: 12/223,271

(22) PCT Filed: Nov. 29, 2006

(86) PCT No.: PCT/IB2006/003398
§ 371 (c)(1),
(2), (4) Date: Feb. 11, 2010

(87) PCT Pub. No.: WO2007/085893
PCT Pub. Date: Aug. 2, 2007

(65) Prior Publication Data
US 2010/0131695 A1    May 27, 2010

(51) Int. Cl.
*G06F 12/00* (2006.01)
(52) U.S. Cl. .......................... 711/173; 711/115; 711/170
(58) Field of Classification Search .................. 711/115, 711/170, 173
See application file for complete search history.

(56) References Cited

U.S. PATENT DOCUMENTS

| | | | |
|---|---|---|---|
| 6,226,755 B1 | 5/2001 | Reeves | |
| 6,374,323 B1 | 4/2002 | Stracovsky et al. | |
| 6,906,978 B2 | 6/2005 | Elzur et al. | |
| 6,931,498 B2 | 8/2005 | Talreja et al. | |
| 7,092,911 B2 | 8/2006 | Yokota et al. | |
| 7,120,729 B2 | 10/2006 | Gonzalez et al. | |
| 7,155,562 B2 | 12/2006 | Li et al. | |
| 2004/0083335 A1* | 4/2004 | Gonzalez et al. | 711/103 |
| 2004/0111553 A1 | 6/2004 | Conley | |
| 2004/0177212 A1* | 9/2004 | Chang et al. | 711/103 |
| 2006/0077914 A1* | 4/2006 | Rhee | 370/293 |
| 2006/0161725 A1 | 7/2006 | Lee et al. | |
| 2007/0047329 A1 | 3/2007 | Kolakowski et al. | |

FOREIGN PATENT DOCUMENTS

| | | |
|---|---|---|
| EP | 1063652 | 12/2000 |
| JP | 2003228513 | 8/2003 |
| JP | 2005196609 | 7/2005 |

OTHER PUBLICATIONS

Office Action with translation dated Apr. 30, 2010 from counterpart Korean Patent Application No. 10-2008-7018178, 7 pages.

(Continued)

*Primary Examiner* — Charles Rones
*Assistant Examiner* — Gurtej Bansal
(74) *Attorney, Agent, or Firm* — Harrington & Smith

(57) ABSTRACT

Apparatuses and methods for implementing partitioning in memory cards and modules where conventional memory cards or modules have only a single partition. A representative memory card/module in accordance with the invention includes a memory devices), and a memory interface which includes a data bus, a command line and a clock line. The memory card/module further includes a memory controller coupled to the memory device(s) and to the memory interface. The memory card/module includes means for controlling the partitioning of the memory device(s), and the memory controller is configured to operate the memory device(s) in accordance with the partition information.

12 Claims, 3 Drawing Sheets

Example of allowed wear-leveling (inside partition) and illegal wear-leveling operation (outside partition boundary)

OTHER PUBLICATIONS

International Search Report and Written Opinion dated Jun. 18, 2007 from counterpart PCT Application No. PCT/IB2006/003398, 15 pages.

Tanzawa et al., "A 44-mm$^2$ Four-Bank Eight-Word Page-Read 64-Mb Flash Memory with Flexible Block Redundancy and Fast Accurate Word-Line Voltage Controller", IEEE Journal of Solid-State Circuits, vol. 37, No. 11, Nov. 2002, pp. 1485-1492.

Office Action with translation dated Dec. 31, 2010 from counterpart Korean Patent Application No. 10-2008-7018178, 5 pages.

Office Action with translation dated Aug. 2, 2011 from Japanese Patent Application No. 2008-551891, 10 pages.

Office Action with translation dated Jan. 31, 2012 from Japanese Patent Application No. 2008-551891, 6 pages.

"The Multi Media Card/Based on System Specification Version 4.1/ System Summary", MMCA Technical Committee, Apr. 2005, 36 pgs.

"The Multi Media Card/System Specification Version 4.1", MMCA Technical Committee, Apr. 2005, 18 pgs.

* cited by examiner

Typical memory card layout
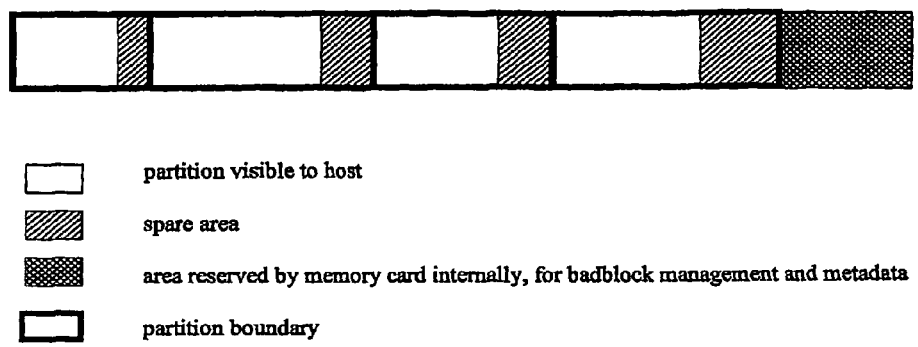
Fig. 1. Example of typical mass memory layout (showing partition boundaries)
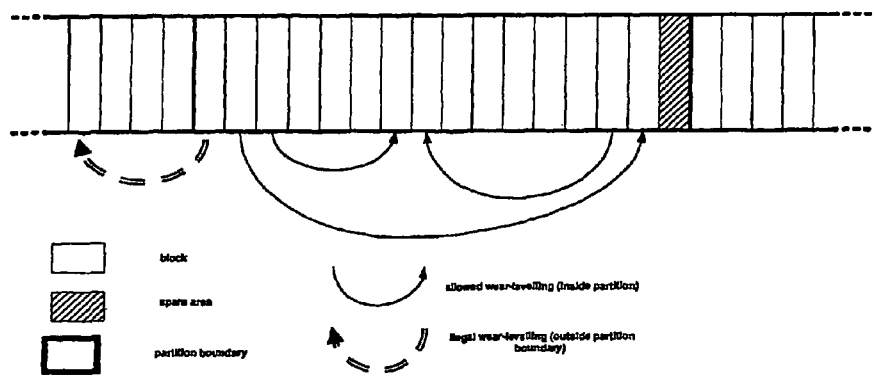
Fig. 2. Example of allowed wear-leveling (inside partition) and illegal wear-leveling operation (outside partition boundary)

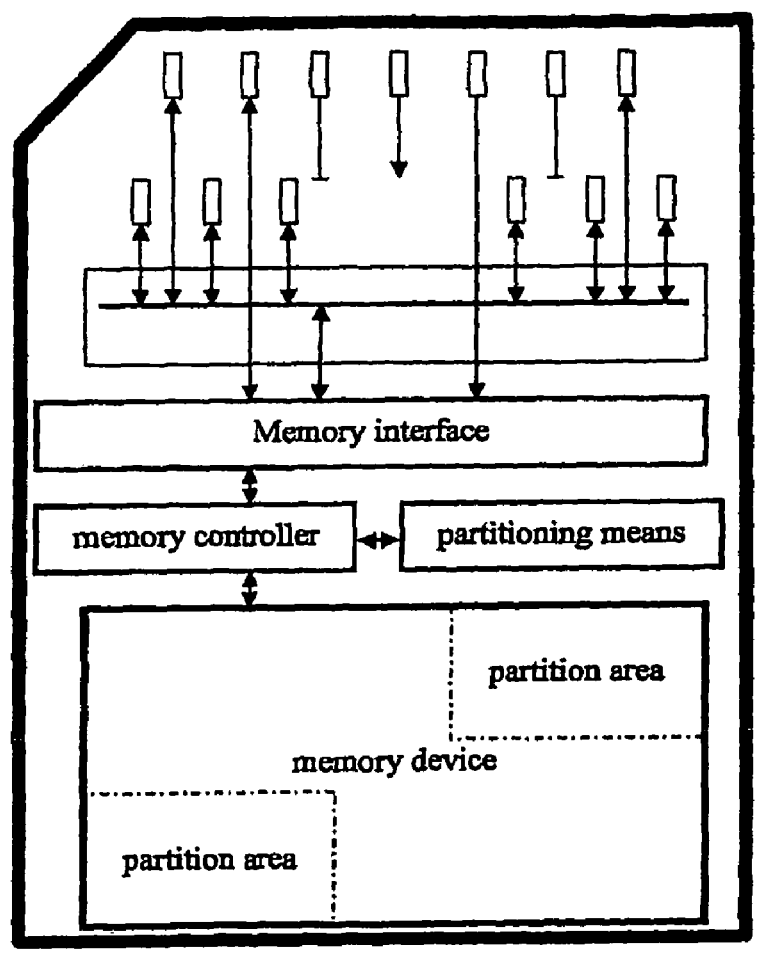
Fig. 3. Example of multimedia card architecture according to the invention

METHOD FOR UTILIZING A MEMORY INTERFACE TO CONTROL PARTITIONING OF A MEMORY MODULE

FIELD OF THE INVENTION

The present invention relates to the technical field of memory cards or modules. It also relates to memory cards or modules using flash and/or ROM technology. More specifically the invention relates to a simple way to implement partitioning in memory cards and modules such as e.g. MultiMediaCard (MMC) cards, SD memory cards or Memory Sticks where a conventional memory cards or modules having only single partition.

The present invention relates to memory cards or modules known for example as MMC cards or e.g. SD cards or Memory Sticks. The MMC and SD specification describes a memory card functionality in a certain card form factor and with a certain electric interface and a data exchange protocol for the exchange of data. This invention describes some additional functionality needed to make system more usable and reliable as embedded mass memory.

BACKGROUND OF THE INVENTION

The properties of MMC cards are disclosed e.g. in the MMC specification "MultiMediaCard System Specification Version 4.1 Official Release (c) April 2005 MMCA".

Presently, the memory card specification does not describe partitioning or other details about the internal functionalities of memory cards. Therefore, the functionality of internal firmware in case of wear leveling, garbage collection, data compaction, bad block management and other memory technology related issues, which are required for proper card functionality, are card specific and cannot be controlled by host.

The flash memory layout of modern mobile terminals has usually multiple partitions. These partitions are usually binary partitions (read-only) and read-write partitions such as known from hard discs. The read-only partitions may be updated only a few times in device lifetime and the probability of their corruption must be very low. The read-write partitions are more heavily used but also there data consistency is very important. There may also be some read-write partitions that contain data needed for device operation (has to be stored highly secured way).

In existing memory cards/modules and memory card specification partitions are not defined (i.e. all data in card can be said to be located in same partition). This means higher risk of data corruption for example during sudden power-cut-off (power supply interruption) situations (if at the same time erase or write operation internally in card going on) and results in lower data security.

Even though data security of data stored in currently used storage card is not yet a highly relevant topic it should be considered as always desirable to increase the data security of storage media.

SUMMARY OF THE INVENTION

According to one aspect of the present invention a memory card or module is provided. Such a memory card or module comprises at least one memory device, a memory interface, and a memory controller. Said memory interface comprises at least a data bus, a command line and clock line. In the memory card or module, the memory controller is connected to said (at least one) memory device and to said memory interface. The memory card or module according to the invention is further provided with means for controlling the partitioning of the said (at lest one) memory device. Additionally, said memory controller is configured to operate said (at least one) memory device in accordance with said partitioning.

The present invention discloses an abstraction layer (with configurable/controllable partitions) on top of existing memory card or module specifications. The partitions, what can be applied to guarantee low probability of data corruption. In practice, this means an additional set of command's (functionalities), states or parameters have to be supported by the memory cards/modules compared to conventional mass memories.

In the following, the term "memory module" is used to denote memory cards and memory modules, not to obscure the specification with terms like "memory cards/modules". Additionally the term "at least one" is omitted in connection with the memory device, as it should be clear that all occurrences of memory devices might also be embodied as multiple memory devices. The expression memory module is synonymously used with the expression "memory card or module" and is used to denote memory cards, embedded memory devices and devices with a memory module interface (such as e.g. a MMC- or SD-card interface) comprising a memory device.

In one example embodiment of the present invention the memory interface is a MMC/SD-card interface. In this example embodiment, the memory module is implemented as a MultiMediaCard (MMC) with the standardized interface and form factor. In another example embodiment, the memory module is implemented as a Secure Digital (SD) card with the standardized interface and form factor. In another example embodiment, the memory module is implemented as a chip scale package with the standardized interface and form factor. This implementation allows the use of a partitionable memory module in mobile (cellular) telephones, in portable cameras, media (e.g. MP3) playback devices and the like.

In another example embodiment of the present invention, said partitioning information comprises information selected from but not limited to the group on size of each partition, start address/stop address of each partition, read only access/read-write access, wear leveling information, number of spare blocks, and fixed partition or reconfigurable partition.

That is, the present invention discloses an abstraction layer (with configurable/controllable partitions) on top of existing memory module specifications. The partitions may be applied to guarantee low probability of data corruption. In practice, it means an additional set of commands (functionality); states or parameters have to be supported by the memory modules compared to conventional mass memories. With this set of commands, it should be possible to define several partitions on the memory device of the memory module. It may also be possible to restrict the maximum amount of partitions that for example to 16 (32, 64, or even 1024). By default whole card may be configured (be visible) as a single read/write partition with default features. The size of each partition (including e.g. a start address and a stop address or a start address and a partition size) may be adjusted or selected separately for each partition.

It is also envisaged to define for each partition if the partition allows read only access or read-write access.

It is also contemplated to define wear-leveling information separately for each partition. Wear leveling information may for example comprise if the wear leveling is activated or deactivated for each partition, and may be also comprise information about which memory (cells or) blocks are actually worn off and which memory (cells or) blocks are used to replace them. It is contemplated to allow only blocks inside the particular partition to be used for the wear leveling of that partition. This kind of "partition internal" wear leveling could minimize data interference between different partitions and simplify recovering after sudden power off.

It is contemplated and envisaged to define for each partition the number of spare block to be reserved for wear leveling operations per partition. It is to be noted that in case of partitions with expectably very different write access rates different numbers of spare blocks may be assigned for each partition. The amount of spare blocks (required if e.g. run time block errors occur) per each partition may be configurable by the host system. Spare blocks of particular partitions may be located in the same address range what is specified for partition. Spare blocks of a particular partition may be located in a common pool of spare blocks. As the probability of block-errors in read-only partitions might not have any spare blocks at all.

It is also contemplated to define for each partition the number of spare blocks to be reserved for at least one fixed partition or at least one reconfigurable partition.

It is also envisaged to create the read-only partitions first as continuous space (area of the memory device) and to create read-write partitions after that. This approach simplifies the access to additional spare blocks in case that wear leveling capacities of a partition are not sufficient and need to be extended (partition shifting).

It is possible to implement said memory device, said memory controller and said means for controlling the partitioning of the said memory device on a single integrated chip. It is also envisaged to implement this embodiment only by integrating the memory controller and said means for controlling the partitioning and only a part of said memory device on a single chip e.g. in this case the memory module of memory card comprises a number of memory chips, connected to the memory interface. It is also contemplated to use a number of memory units (located e.g. on a single or a number of chips) forming together said memory device.

In an example embodiment said memory device is a flash memory.

In still another example embodiment of the present invention a said memory controller is configured to check the correctness of said partition information. It may be checked if the selected partition fits to memory module geometry. It may also be checked if partitions are overlapping. It may also be determined if a minimal amount of spare blocks may be provided for a memory partition to allow wear leveling. It is also contemplated to monitor the partition information and additionally evaluate and reallocate the partitions (e.g. for expanding spare blocks, moving partitions and the like). With these abilities, the memory module is able to accommodate even larger "blackouts" of memory cells/sections/areas. Subsequently to a respective check, a negative result of said checking operation may be output (a positive result of the check may also be provided to a user but will not be considered as providing any useful information). Thereby, a user may be informed that a repartitioning operation is considered necessary.

According to another aspect of the present invention, a method for utilizing a memory interface of a memory module is provided. The memory interface comprises (at least) a data bus, a command line and a clock line. The method comprises receiving at a memory controller of a memory module, a signal indicative of partitioning information, storing said partitioning information in a memory module, and operating said memory device by said memory controller in accordance with said partition information. Throughout the specification the term "signal" should be understood in broad sense, i.e., should cover both sending software through interface and hardware signaling. It may be noted that the memory interface is the interface of the memory module to a host device.

In an example embodiment of the method of the present invention, said signal indicative of partitioning information comprises information selected from but not limited to the group of size of each partition, start address/stop address of each partition, read only access/read-write access, wear leveling information for each partition, number of spare blocks for each partition and if said partition is a fixed partition or reconfigurable partition. After storing said partitioning information the method may further comprise extracting said information from said received signal and defining partitions of a memory device. Said operating said memory device in accordance with said partition information may also comprise accessing the memory device in accordance with said defined partitions, and controlling read/write access and wear leveling for each partition separately.

In yet another example embodiment of the method of the present invention said memory controller is configured to check the correctness of said partition information. Thereby it can be checked if the selected partition fits the memory module/device geometry. It may also be checked if the partition information defines e.g. overlapping partitions. It may be determined if a minimal amount of spare blocks are provided for a memory partition to enable wear leveling. Subsequently to a respective check, a negative result of said checking operation may be output. Thereby, a user can be informed that a repartitioning operation is considered as being necessary.

According to another aspect of the present invention, a method for utilizing a memory interface of a memory module is provided. The memory interface comprises a data bus, a command line and a clock line. The method comprises sending from a host device, a signal indicative of partitioning information, at a memory controller of a memory module and, operating said memory device by said memory controller in accordance with said partition information.

In an example embodiment of the method of the present invention, said signal indicative of partitioning information comprises information selected from but not limited to the group of: size of each partition, start address/stop address of each partition, read only access/read-write access, wear leveling information for each partition, number of spare blocks for each partition, and if a partition is a fixed partition or reconfigurable partition. After storing said partitioning information the method may further comprise extracting said information from said received signal and defining partitions of a memory device. Said operating said memory device in accordance with said partition information may also comprise accessing the memory device in accordance with said defined partitions, and controlling read/write access and wear leveling for each partition separately.

According to yet another aspect of the invention, a software tool is provided comprising program code means for carrying out the method of the preceding description of utilizing a memory interface when said program product is run on memory module. According to this and the following aspects of the present invention said memory interface comprises of (at least) a data bus, a command line and a clock line.

According to another aspect of the present invention, a computer program product downloadable from a server for carrying out the method of the preceding description of utilizing a memory interface is provided when said program product is run on memory module.

According to yet another aspect of the invention, a computer program product is provided comprising program code means stored on a computer readable medium for carrying out the methods of the preceding description of utilizing a memory interface when said program product is run on memory module.

According to another aspect of the present invention, a computer data signal is provided. The computer data signal is embodied in a carrier wave and represents a program that makes the computer or the memory module (it is received at or forwarded to) perform the steps of the method contained in the preceding description of utilizing a memory interface is provided when said program product is run on memory module.

BRIEF DESCRIPTION OF THE DRAWINGS

FIG. 1 depicts an example of typical memory layout (showing partition boundaries).

FIG. 2 depicts a visualization of allowed (inter-partition) and not allowed (extra-partition) wear-leveling operations.

FIG. 3 is a schematic view of a memory card according to one aspect of the present invention.

DETAILED DESCRIPTION OF EMBODIMENTS OF THE INVENTION

Figure 4:
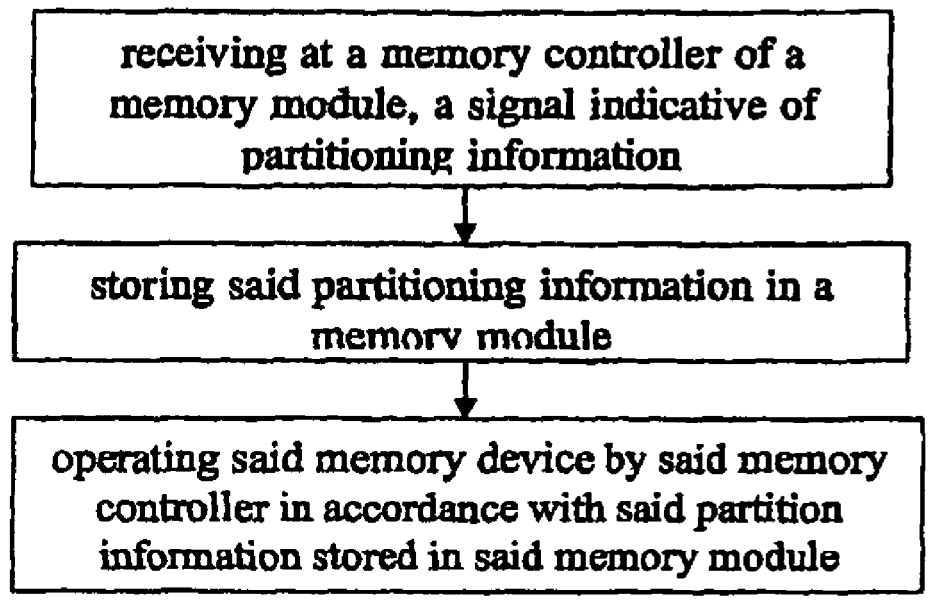
FIG. 4 is a flowchart depicting an implementation of the method of the present invention.

In the detailed description that follows, identical components have been given the same reference numerals, regardless of whether they are shown in different embodiments of the present invention. In order to clearly and concisely illustrate the present invention, the drawings may not necessarily be to scale and certain features may be shown in somewhat schematic form.

FIG. 1 depicts an example of typical embedded mass memory layout. The mass memory comprises different partitions delimited by the boldly sketched partition boundaries. In each partition, a part is depicted as "visible partition" to a host (depicted as the blank areas). Additionally to the partitions visible to a host invisible spare areas are provided (invisibly to a host) in each partition. On each memory module, an area is reserved memory module internally (as an area in the memory core/module or as an extra means for controlling the partitioning of the said memory device) for storing data for bad-block management and memory module metadata.

FIG. 2 depicts an example of allowed (in-partition) wear leveling and not allowed (inter-partition) wear-leveling operations. In contrast to known memory modules without partitioning, inter-partition wear leveling may not occur (due to a lack of partitions especially of different partitions). In figure it is indicated that it is allowed to shift (or wear level) different block within a single partition (within the partition boundaries indicted by the bold lines) as indicated by the arrows. However, it is not allowed to use inter-partition wear leveling as indicated by the interrupted arrow crossing a partition boundary. Anyhow, the present invention allows to shift the partitions, which in turn may allow to shift partitions first and subsequently perform an in-partition wear leveling process that otherwise would have been an inter-partition wear leveling process.

FIG. 3 is a schematic view of a memory card according to one aspect of the present invention. An MMC card (Multi-Media Card) is depicted with the usual electrical interface (comprising contacts to a data bus, for power supply, ground level, command and clock signal) and having the usual MMC form factor. As in a conventional MMC-card, the contacts are connected to a memory interface controller serving to control the data exchange via the external contacts of the MMC card. The memory interface controller is connected via the memory controller to the memory device. In contrast to conventional MMC-cards, the memory controller is connected to a dedicated units/means for controlling the partitioning of the said memory device to simplify the figure the means for controlling the partitioning of the said memory device is named partitioning means in the figure. In this means for controlling the partitioning of the said memory device the memory controller can store partition information related to the memory device, to define in the memory device partition areas indicated by the interrupted doted lines in the memory device (memory area or memory core). It may be noted that the means for controlling the partitioning of the said memory device may also be embodied as a dedicated area (or even partition area) of the memory device itself, to enable the MMC-card provide partitionability with only a single memory device. (It may be envisaged to hardcode the memory area (address) allocated to the means for controlling the partitioning of the said memory device in the memory controller itself.)

With a memory device to store partition information (and, if the processing capability of the memory controller is sufficient) the memory module is enabled to operate the memory device or the access to the memory device in accordance with partition data of said means for controlling the partitioning of the said memory device.

For the sake of clarity, additional components of the MMC card such as the memory device interface controller (which may also be comprised of the memory controller) or memory device power detection (to reset the memory device interface and the memory interface controller) have been omitted.

FIG. 4 is a flowchart depicting an implementation of the method of the present indention. The flowchart starts with the step of receiving at a memory controller of a memory card, a signal indicative of partitioning information. This information may be received from an external host via the memory interface at a memory (module) interface controller. Then said received partitioning information is provided to means for controlling the partitioning of the said memory device assigned to said memory controller. Then the memory controller of the memory module operates said memory device in accordance with said partition information stored of said means for controlling the partitioning of the said memory device.

Even though not explicitly cited in the flowchart, the partitioning information may be selected from but not limited to the group of: size of each partition, start address/stop address of each partition, access type of the partition such as read-only-access or read-write-access, wear leveling information for each partition (which blocks are worn and which blocks replace them), and number of spare blocks for each partition (which may freely be selected in dependence of an MTBF (mean time before failure) to be achieved). After receiving said partitioning information the method may further comprise extracting said information from said received signal, storing said extracted information and defining partitions (with respective partition parameters) on said a memory device. Said operating said memory device in accordance with said partition information may also comprise (defining said partitions, with all partition parameters) accessing the memory device in accordance with said defined partitions (i.e. partition wise), and controlling read/write access and wear leveling for each partition separately.

Figure 5:
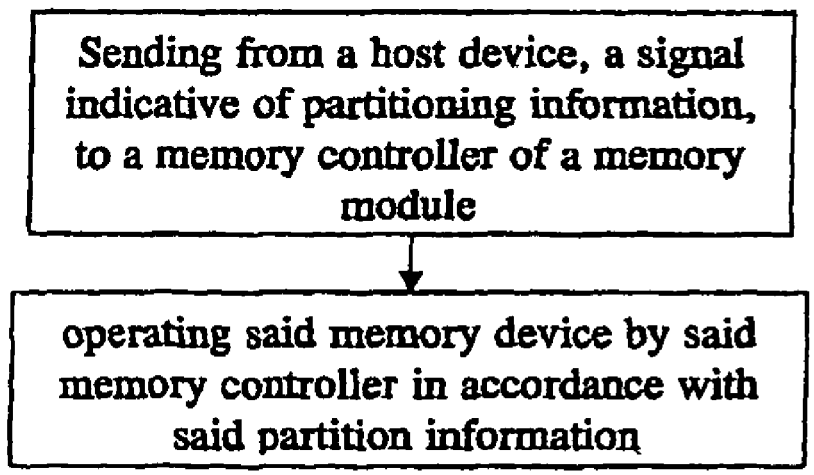
FIG. 5 is a flowchart depicting another implementation of the method of the present invention.

FIG. 5 is a flowchart depicting another implementation of the method of the present invention. The flowchart starts with the step of sending from a host device to a memory controller of a memory module, a signal indicative of partitioning information. Then the host device operates said memory device in accordance with said partition information. This implementation represents the host device side of the present invention.

This may be implemented by a special set of commands that could be defined for control partitioning. For example, the EXT_CSD command (specified in MMCA v4.1 specification) may be used as basis. It should be possible to define amount of partitions and separately for each partition: a start address, an end address, if the partition allows read only or read-write operations, if wear leveling is activated or not. It may be envisaged to (by default) not allow wear leveling in read-only partitions.

With the present invention, it becomes possible to do re-partition the storage of the memory module freely at any time (if it is connected to a host).

The description of dedicated access procedures, wear leveling procedures and partitioning information data formats have been omitted for not obscuring the description of the figures.

By using partitioning in memory cards/modules, it may be possible to reduce risk of data corruption. With partitioning it is also possible to keep read-only data on fresh non-wear leveled areas (data retention is also depends from erase count). This has the additional advantage that spare regions (areas or blocks) may additionally be used in the read/write regions (areas or blocks) improving the expected overall lifetime of a memory module. By dividing the memory (core) to several partitions may reduce the lifecycle of certain read-write areas (each memory block has limited erase count), but in view of the benefit from higher data consistency this seem to be acceptable.

It is to be noted that the present invention is able to control the internal lower level partitioning of memory cards/modules from a host device (via a memory module interface such as the MMC/SD card interface). Up to now, existing cards did not offer this possibility but use a fixed internal physical partitioning of memory device (and then provide a FAT partitioning on top of that). In contrast to the known approaches, the present invention adds a third partitioning layer between the card internal physical layer partition and the FAT partition.

Partition in document means: Memory module is plurality of sectors visible to user. The plurality of sectors (continuous address space) is divided on sections with some module specific granularity. One section is a partition. Each partition has a set of features (RO, R/W, etc). Set of features are describing the behavior of the partition to the user/host.

This application contains the description of implementations and embodiments of the present invention with the help of examples. It will be appreciated by a person skilled in the art that the present invention is not restricted to details of the embodiments presented above, and that the invention can be implemented in another form without deviating from the characteristics of the invention. The embodiments presented above should be considered illustrative, but not restricting. Thus, the possibilities of implementing and using the invention are only restricted by the enclosed claims. Consequently, various options of implementing the invention as determined by the claims, including equivalent implementations, also belong to the scope of the invention.

What is claimed is:

1. An apparatus comprising:
   a memory controller; and at least one memory including computer program code, the at least one memory and the computer program code configured to, with the memory controller, cause the apparatus to perform at least the following:
   to receive partitioning information comprising wear leveling instructions for at least one memory device, wherein the at least one memory device is prohibited from performing inter-partition wear leveling;
   in response to the wear leveling instructions being inter-partition wear leveling instructions, to shift at least one partition in the at least one memory device such that the wear leveling instructions are in-partition wear leveling instructions for the shifted at least one partition; and
   to perform the wear leveling instructions using the shifted at least one partition.

2. An apparatus according to claim 1, further comprising a MMC/SD-card interface.

3. An apparatus according to claim 1, wherein said partitioning information further comprises information selected from but not limited to the group of:
   size of each partition,
   start address/stop address of each partition,
   read only access/read-write access,
   number of spare blocks, and
   fixed partition or reconfigurable partition.

4. An apparatus according to claim 1, wherein said at least one memory device is a flash memory.

5. An apparatus according to claim 1, wherein the apparatus is implemented on a single chip.

6. An apparatus to claim 1, wherein the at least one memory and the computer program code are further configured to cause the apparatus to check the correctness of said partition information.

7. A method comprising:
   receiving, at a memory controller of a memory module, partitioning information comprising wear leveling instructions for the memory module, wherein the memory module is prohibited from performing inter-partition wear leveling;
   in response to the wear leveling instructions being inter-partition wear leveling instructions, shifting at least one partition in the memory module such that the wear leveling instructions are in-partition wear leveling instructions for the shifted at least one partition; and
   performing the wear leveling instructions using the shifted at least one partition.

8. A method according to claim 7, wherein said partitioning information comprises information selected from but not limited to the group of:
   size of each partition,
   start address/stop address of each partition,
   read only access/read-write access, number of spare blocks for each partition, and
   fixed partition or reconfigurable partition.

9. A computer readable medium tangibly encoded with a computer program computer program executable by a processor to perform actions for carrying out the steps of claim 7, when said computer program is run on a memory module.

10. A method comprising:
    receiving, from a host device partitioning information, at a memory controller of a memory module, wherein said partitioning information comprises wear leveling instructions for the memory module, and wherein the at least one memory device is prohibited from performing inter-partition wear leveling;

in response to the wear leveling instructions being inter-partition wear leveling instructions, shifting at least one partition in the memory module such that the wear leveling instructions are in-partition wear leveling instructions for the shifted at least one partition; and performing the wear leveling instructions using the shifted at least one partition.

11. A method according to claim 10, wherein said partitioning information comprises information selected from but not limited to the group of:

size of each partition,
start address/stop address of each partition,
read only access/read-write access,
number of spare blocks for each partition, and
fixed partition or reconfigurable partition.

12. A computer program product capable of utilizing a memory module, comprising program code sections for carrying out the steps of claim 10, when said program is run on a memory module.

* * * * *